United States Patent
Lee

(10) Patent No.: US 7,502,932 B2
(45) Date of Patent: Mar. 10, 2009

(54) RETURN ROUTABILITY METHOD FOR SECURE COMMUNICATION

(75) Inventor: Young-ji Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1074 days.

(21) Appl. No.: 10/782,854

(22) Filed: Feb. 23, 2004

(65) Prior Publication Data
US 2004/0179688 A1 Sep. 16, 2004

(30) Foreign Application Priority Data
Mar. 12, 2003 (KR) .................. 10-2003-0015538

(51) Int. Cl.
*G04F 9/00* (2006.01)
(52) U.S. Cl. ..................... 713/171; 380/273
(58) Field of Classification Search .............. 713/171
See application file for complete search history.

(56) References Cited

U.S. PATENT DOCUMENTS

| | | | | |
|---|---|---|---|---|
| 5,434,918 A * | 7/1995 | Kung et al. | ................. | 713/169 |
| 5,757,924 A * | 5/1998 | Friedman et al. | ............ | 713/151 |
| 6,263,437 B1 * | 7/2001 | Liao et al. | ................... | 713/169 |
| 6,507,908 B1 * | 1/2003 | Caronni | ...................... | 713/153 |
| 6,510,154 B1 * | 1/2003 | Mayes et al. | ................ | 370/389 |
| 7,043,633 B1 * | 5/2006 | Fink et al. | .................. | 713/162 |
| 2002/0186846 A1 * | 12/2002 | Nyberg et al. | ............... | 380/273 |

OTHER PUBLICATIONS

Sudanthi, Sudha. "Mobile IPv6," GSEC Version 1.4b, Publication: Jan. 17, 2003.*

D. Johnson, et al., Mobility Support in IPv6 draft-ietf-mobileip-ipv6-21.txt, IETF Mobile IP Working Group Internet-Draft, Feb. 26, 3003, Expires: Aug. 27, 2003.

Faccin S M et al: "A secure and efficient solution to the IPv6 address ownership problem", Nokia Research Center, Sep. 9, 2002, pp. 162-166, XP010611839.

D.B. Johnson, Rice University, C. Perkins, Nokia Research Center: "Mobility Support in IPv6", Internet Draft, Online! XP002282180.

S. Sudanthi: "Mobile IPv6" Sans Institute, 'Online! XP002282181.

G. Montenegro, A. Petrescu: "MIPv6 Security: Assessment of Proposals", Internet Draft, Online!, Nov. 30, 2001, XP002282182.

* cited by examiner

*Primary Examiner*—Kambiz Zand
*Assistant Examiner*—Dant B Shaifer Harriman
(74) *Attorney, Agent, or Firm*—Sughrue Mion, PLLC

(57) ABSTRACT

Disclosed is an RR (Return Routability) method for secure communication that improves security by eliminating the threat of a man in the middle attack. A mobile node transmits an HoTI (Home Test Init) packet to the home agent, and transmits a CoTI (Care of Test Init) packet to the corresponding node. A home agent transmits the HoTI packet including first key information generated by a specified method to a corresponding node, and the corresponding node transmits an HoT (Home of Test) packet including second key information generated by a specified method to the home agent and transmits a CoT (Care-of Test) packet encrypted using a secret key generated from the first key information by a specified method to the mobile node. The home agent transmits the secret key generated from the received HoT packet by the specified method to the mobile node, and the mobile node decodes the received encrypted CoT packet using the received secret key.

6 Claims, 4 Drawing Sheets

RETURN ROUTABILITY METHOD FOR SECURE COMMUNICATION

CROSS-REFERENCE TO RELATED APPLICATIONS

This application claims the benefit of Korean Patent Application No. 2003-15538 filed Mar. 12, 2003, in the Korean Intellectual Property Office, the disclosure of which is incorporated herein by reference.

BACKGROUND

1. Field of the Invention

The present invention relates to an RR (Return Routability) method, and more particularly, to an RR method which can guarantee a stable communication through improved security.

2. Description of the Related Art

In Mobile IPv6 (Internet Protocol version 6), communication nodes on the Internet can communicate with one another as they freely change their linked networks. In Mobile IPv6, a communication node, which can change its point of attachment from one link to another link, is called a mobile node (MN), and a communication node, which is communicating with the mobile node, is called a corresponding node (CN). The corresponding node may be either static or dynamic.

The mobile node, in case of moving from one link to another link, can continuously perform a communication through a home address that is an IP address allocated to the mobile node in its own home link. That is, the mobile node, while visiting a foreign link that is not its home link, should be allocated with a CoA (Care-of Address) that is the IP address connected to the mobile node, and inform the CoA to the corresponding node. Accordingly, when the mobile node leaves from its own home link and moves to another foreign link, it requires a binding update (BU) process for registering the CoA allocated to itself in its home agent and the corresponding node.

FIG. 1 is a view explaining a BU process. Referring to FIG. 1, there are a mobile node 100 that has moved from its home link to a foreign link, a home agent 150, and a corresponding node 200. The home agent is a router on the home link registered by the mobile node 100 as the present CoA of the mobile node itself.

The mobile node 100 registers its CoA in the home agent 150 and the corresponding node 200 through the BU process. After the BU process is completed, the home agent 150, while the mobile node 100 is separated from the home link, seizes a packet on the home link that is appointed as the home address of the mobile node 100 for encapsulation, and performs a tunneling in order for the packet to reach the registered CoA of the mobile node 100.

In order to perform the BU process, however, an RR (Return Routability) process for confirming whether the mobile node 100 is a proper node that can perform the BU process should precede performance of the BU process. Through this RR process, the corresponding node 200 authenticates the mobile node 100. Also, the RR process is performed through a process in which the mobile node 100 exchanges data for performing the BU process with the home agent 150 and the corresponding node 200.

FIG. 2 is a message sequence chart explaining the RR process.

Referring to FIG. 2, the mobile node 100 transmits an HoTI (Home Test Init) packet to the home agent 150 (S300), and transmits a CoTI (Care of Test Init) packet to the corresponding node 200 (S320). The home agent 150 transmits the HoTI packet received from the mobile node 100 to the corresponding node 200 (S310).

The corresponding node 200 receives the HoTI packet and the CoTI packet, and authenticates the mobile node 100 accordingly. That is, the corresponding node 200 transmits an HoT (Home of Test) packet corresponding to the HoTI packet to the home agent 150 (S330), and transmits a CoT (Care-of Test) packet corresponding to the CoTI packet to the mobile node 100 (S350). The HoT packet includes a MAC (Message Authentication Code) hash function that includes a nonce value, and this value is used for authenticating the mobile node 100 during the BU process. The home agent 150 transmits the HoT packet received from the corresponding node 200 to the mobile node 100 (S340).

Meanwhile, between the mobile node 100 and the corresponding node 200 may exist a man in the middle attack in which an attacker observes furtively the transmitted/received packets. It is possible that the man in the middle attack pretends to be the mobile node 100 by seizing the CoT packet coming from the corresponding node 200, or obtains the authority on the BU by seizing the CoTI packet.

FIGS. 3A and 3B are views illustrating various kinds of middle attacks that may be made during the related art RR process.

FIG. 3A shows a case that a mobile node 100a and a home agent 150a share a router 50a on a network. In this case, the man in the middle attack can seize all the HoTI packets and CoTI packets near the router 50a.

FIG. 3B shows a case that respective nodes 10b, 150b and 200b are connected to a network through ISPs (Internet Service Providers) 60a, 60b and 60c. In this case, the man in the middle attack can seize all the packets transmitted to the corresponding node 200b through the corresponding ISP 60c near the ISP 60c to which the corresponding node 200b belongs.

FIG. 3C shows a case that the man in the middle attack is in the middle of a path for transmitting packets to the corresponding node 200c through the network. In this case, in the same manner as the case of FIG. 3B, for the man in the middle attack, an attacker who is on the path connected to the corresponding node 200c, can seize all the packets transmitted to the corresponding node 200c.

As described above, various attacks can be made during the related art RR process, and if the man in the middle attack is near the corresponding node, it is much easier for the attacker to seize the packets transmitted to the corresponding node. Also, since all the communications of the Mobile IPv6 are basically performed by wireless, more threats of the attacker than those in a wire communication environment are carried out. Consequently, a new RR method that can improve security by preventing attacks during the RR process is required.

SUMMARY

Accordingly, an exemplary aspect of the present invention is to provide an RR (Return Routability) method that improves the security by reducing the threat of a man in the middle attack.

To achieve the above exemplary aspect and/or other features of the present invention, there is provided an RR (Return Routability) method among a mobile node, a home agent and a corresponding node, the method comprising the mobile node transmitting an HoTI (Home Test Init) packet to the home agent and transmitting a CoTI (Care of Test Init) packet to the corresponding node, the home agent transmitting the HoTI packet including first key information generated by a specified method to the corresponding node, the corresponding node transmitting an HoT (Home of Test) packet including second key information generated by a specified method to the home agent and transmitting a CoT (Care-of Test) packet encrypted using a secret key generated from the first key information by a specified method to the mobile node, the home agent transmitting the secret key generated from the received HoT packet by the specified method to the mobile node, and the mobile node decoding the received encrypted CoT packet using the received secret key.

Preferably, but not necessarily, the specified method is a Diffie-Hellman key exchange method using public parameters and a certain secret key.

Also, it is preferable, but not necessary, that the first key information is attached to a mobile options field of the HoTI packet, and the second key information is attached to a mobile options field of the HoT packet.

It is also preferable, but not necessary, that the encryption method uses a DES (Data Encryption Standard) algorithm.

BRIEF DESCRIPTION OF THE DRAWINGS

The above exemplary objects and other advantages of the present invention will become more apparent by describing in detail illustrative, non-limiting embodiments thereof with reference to the attached drawings in which.

DETAILED DESCRIPTION OF THE ILLUSTRATIVE EMBODIMENTS

Figure 1:
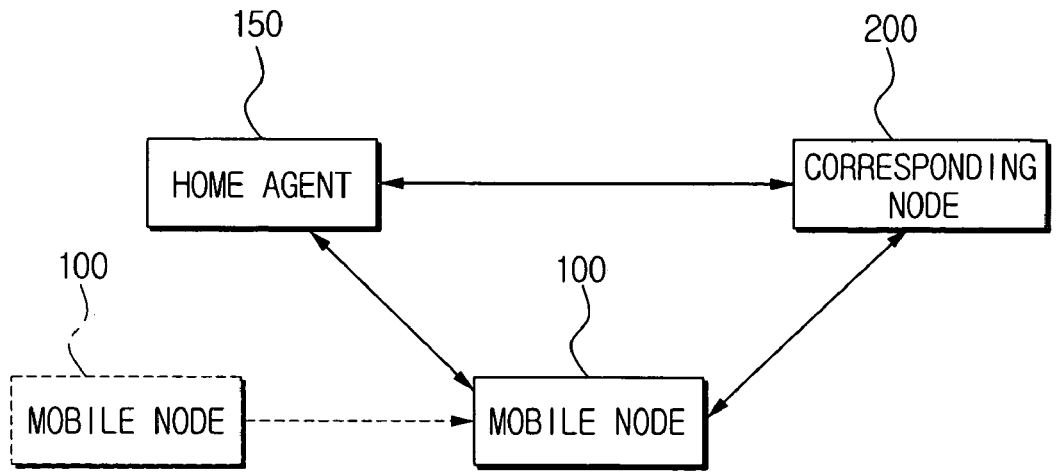
FIG. 1 is a view explaining a BU process.
Figure 2:
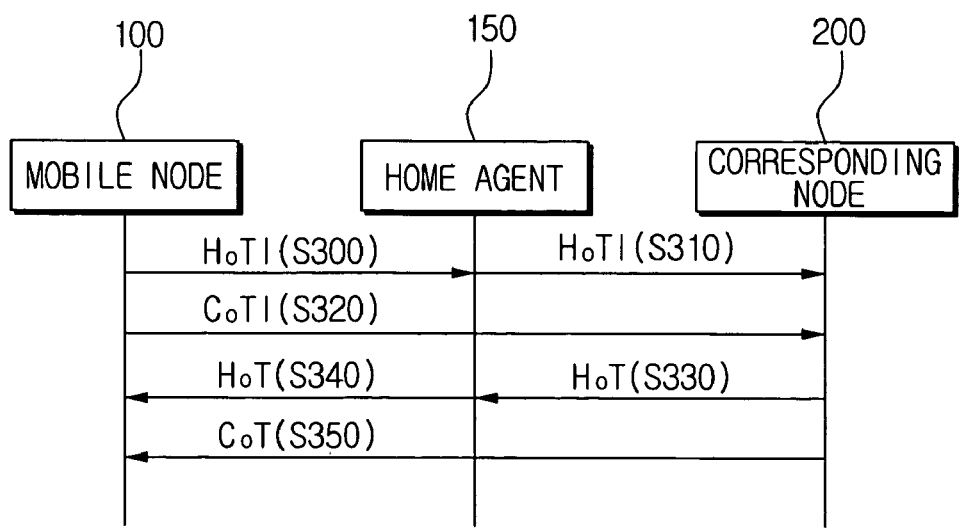
FIG. 2 is a message sequence chart explaining an RR process.
Figure 3A:
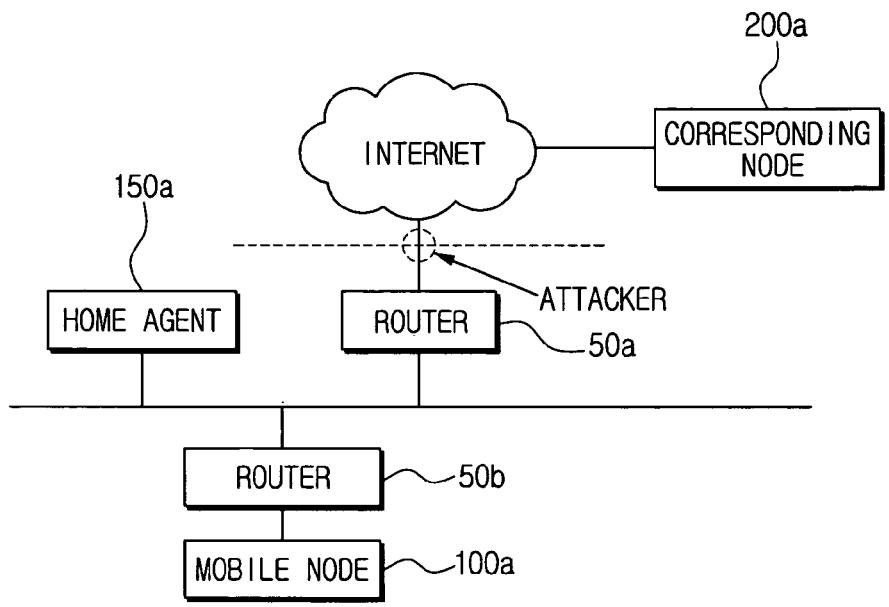
FIGS. 3A to 3C are views explaining middle attacking processes.
Figure 3B:
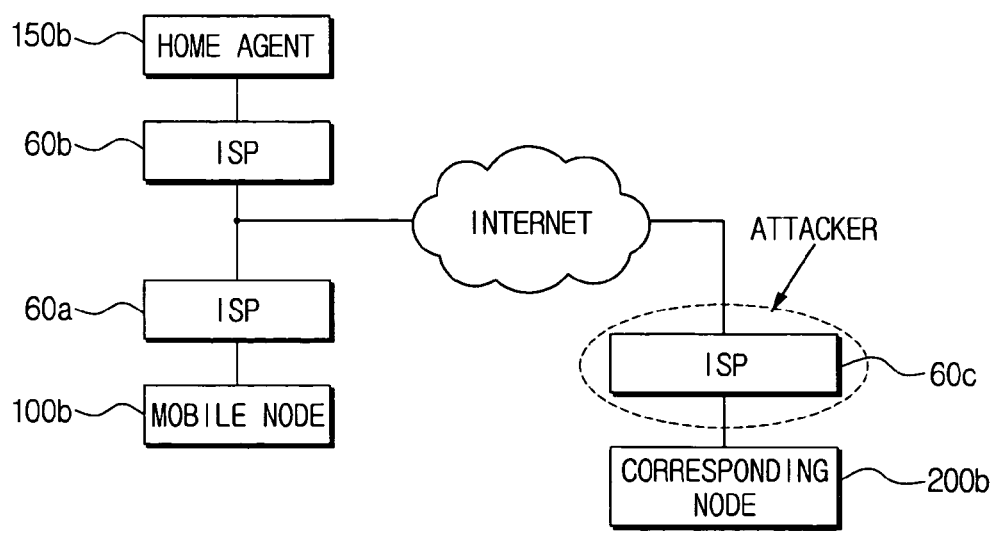
Figure 3C:
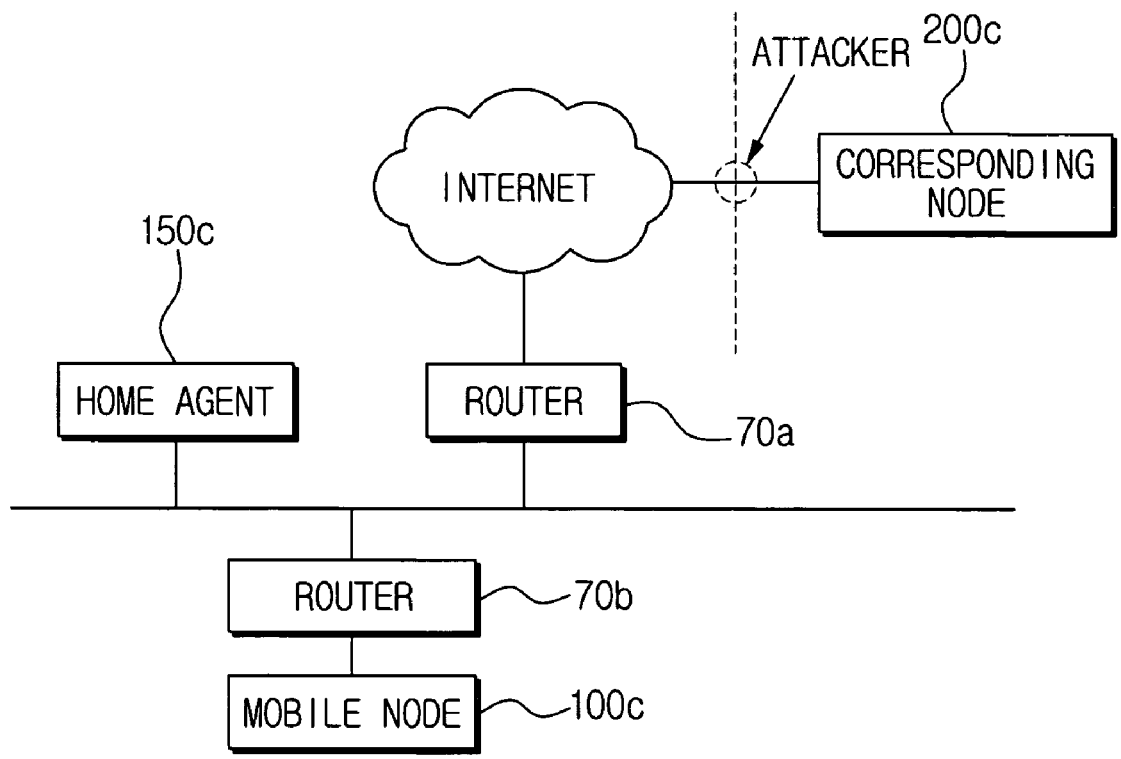

Now, an RR method according to an illustrative embodiment of the present invention will be described in detail with reference to the annexed drawings in which like reference numerals refer to like elements.

Figure 4:
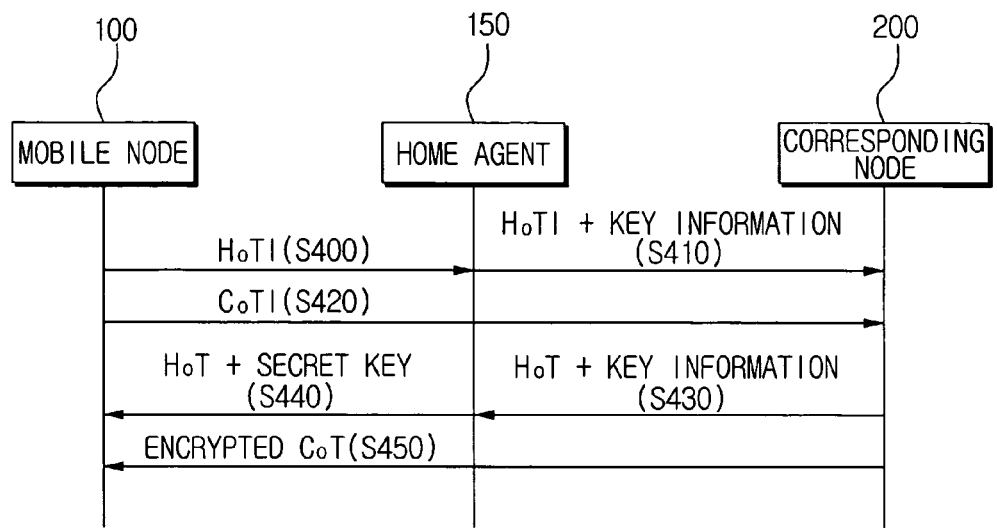
FIG. 4 is a message sequence chart explaining a process of performing an RR method according to the present invention.

FIG. 4 is a message sequence chart explaining a process of performing an RR method according to the present invention. In the present invention, the following conditions are basically assumed. That is, a secure channel exists between a mobile node 100 and a home agent 150, and public values p and q for the Diffie-Hellman key exchange exist between the home agent and a corresponding node 200.

In such conditions, the mobile node 100 transmits an HoTI (Home Test Init) packet to the home agent 150 (S400), and transmits a CoTI (Care of Test Init) packet to the corresponding node 200 (S420). The HoTI packet that the mobile node 100 transmits to the home agent 150 includes the following information.

HoTI:
Source=home address
Destination address=correspondent address
Parameter: Home Init Cookie Also, the CoTI packet that the mobile node 100 transmits to the corresponding node 200 includes the following information.

CoTI
Source=care-of address
Destination address=correspondent address
Parameter: Care-of Init Cookie The home agent 150 includes key information calculated using a certain secret key and public values in the received HoTI packet, and transmits the HoTI packet to the corresponding node 200 (S410). At this time, the key information may be added to a mobile options field of the HoTI packet. By this method, only the key information calculated by the public values and so on is transmitted, and the secret key is not open to the public on a network.

The corresponding node 200 transmits the HoT packet in response to the HoTI packet transmitted from the home agent 150 (S430). At this time, the transmitted HoT packet includes the key information calculated by the public values and a certain secret key. The key information may be added to the mobile options field of the HoT packet, and by this method, the home agent 150 and the corresponding node 200 have a shared secret key by exchanging the key information.

For the key exchange between the home agent 150 and the corresponding node 200, the Diffie-Hellman (DH) key exchange method can be used. A DH key exchange algorithm enables two communication nodes to share a secret key of their own when they communicate with each other on a network open to the public.

The DH key exchange method was developed by Diffie and Hellman in 1976, and published through a thesis entitled "New Directions in Cryptography." This method enables generation of a common secret key on an unsafe medium without any advance secret exchange between two communication nodes. The DH key exchange method has two system parameters p and q, which are both open to the public and can be used by all users in the system. The parameter p is a prime number, and the parameter q that is called a generator is an integer that is smaller than the parameter p. The parameter q can generate all elements from 1 to p-1 when it is multiplied by a divisor of the prime number p as many as the certain number of times. Using these parameters, the home agent 150 and the corresponding node 200 generate the common secret key through the following process.

First, the home agent 150 generates a random secret key a, and the corresponding node 200 generates a random secret key b. Then, they generate public keys by the following equation using the parameters p and q and the secret keys.

$$Y_a = q^a \bmod p$$

$$Y_b = q^b \bmod p \quad \text{[Equation 1]}$$

Here, $Y_a$ is the public key of the home agent 150, and $Y_b$ is the public key of the corresponding node 200. If the generation of the public keys is completed, they are exchanged between the home agent 150 and the corresponding node 200. If the public keys are exchanged, the home agent 150 and the corresponding node 200 can generate the common secret key K by the following equation.

$$K_a = (Y_b)^a \bmod p$$

$$K_b = (Y_a)^b \bmod p \quad \text{[Equation 2]}$$

Since $K_a = K_b = K$, the home agent 150 and the corresponding node 200 have the common secret key, but other nodes cannot analogize the secret key. Thereafter, the home agent 150 transmits the HoT packet received from the corresponding node 200, along with the generated secret key K, to the mobile node 100 (S440).

Meanwhile, the corresponding node 200 encrypts the CoT packet using the secret key generated by exchanging the key information with the home agent 150, and transmits the encrypted CoT packet to the mobile node 100 (S450). The mobile node 100 can decode the encrypted CoT packet received from the corresponding node 200 using the secret key received from the home agent 150.

In encrypting the CoT packet, various encryption methods may be used. A distinctive feature of the Mobile IPv6 that should be a primary consideration is keeping the communication link of the mobile node 100 connected (i.e., preventing disconnection of the communication link of the mobile node 100) by applying the fastest and simplest algorithm to any process during the movement of the mobile node 100.

For this, the present invention uses a DES (Data Encryption Standard) algorithm for encrypting the CoA packet. The DES algorithm is a symmetric key block algorithm, and has been widely used as a data encryption method using a personal key. In order to protect the data on the network using the DES algorithm, the communication nodes should know the common secret key to be used for the encryption and decoding operation. The DES algorithm produces a 64-bit cryptogram from the 64-bit data block using a key having a length of 56 bits and through 16 operations.

In the DES algorithm, it is possible to use encryption keys the number of which is over 72,000,000,000,000,000. A key for a given message is randomly selected from among the huge number of encryption keys. In the same manner as other personal key encryption methods, both the sender and the receiver should know and use the same personal key, and thus in the present invention, a shared secret key is generated from the key information exchange between the home agent 150 and the corresponding node 200. According to the use environments, the use of a "triple DES" to which three keys are successively applied may be considered.

Figure 5:
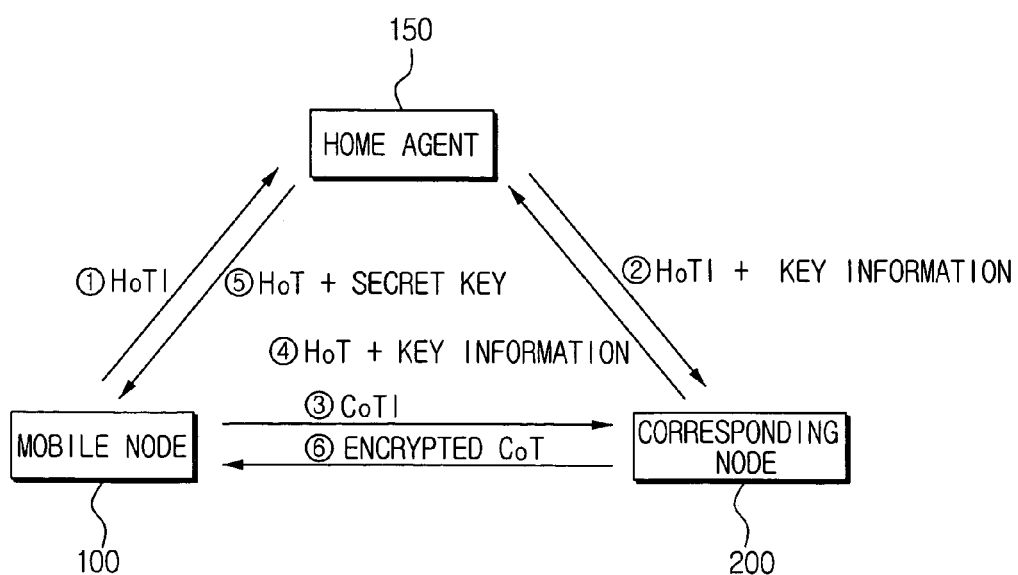
FIG. 5 is a view explaining an RR method according to the present invention.

Meanwhile, referring to FIGS. 4 and 5, since only the mobile node 100 having a secret key can decode the encrypted CoA packet transmitted from the corresponding node 200, the threat of a middle attack can be eliminated, and thus, security can be improved during the RR process. Simultaneously, the authentication of the mobile node 100 is possible. Also, since the key exchange is not performed between the mobile node 100 and the corresponding node 200, but is performed between the home agent 150 and the corresponding node 200, security is further improved.

As described above, according to the present invention, the middle attack threat can be eliminated by generating a secret key between the home agent and the corresponding node using public keys, encrypting the packet transmitted from the corresponding node to the mobile node using the generated secret key, and decoding the encrypted packet using the secret key. Accordingly, security can be improved.

While the present invention has been described in detail, it should be understood that various changes, substitutions and alterations can be made hereto without departing from the spirit and scope of the invention as defined by the appended claims.

What is claimed is:

1. An RR (Return Routability) method among a mobile node, a home agent and a corresponding node, the method comprising:

the mobile node transmitting an HoTI (Home Test Init) packet to the home agent, and transmitting a CoTI (Care of Test Init) packet to the corresponding node;

the home agent transmitting the HoTI packet including first key information generated by a specified method to the corresponding node;

the corresponding node transmitting an HoT (Home of Test) packet including second key information generated by the specified method to the home agent, and transmitting a CoT (Care-of Test) packet encrypted using a secret key generated from the first key information by the specified method to the mobile node;

the home agent transmitting the secret key generated from the received HoT packet by the specified method to the mobile node; and the mobile node decoding the received encrypted CoT packet using the received secret key.

2. The method of claim 1, wherein the specified method is a Diffie-Hellman key exchange method using public parameters and secret key parameters to generate the secret key.

3. The method of claim 1, wherein the first key information is attached to a mobile options field of the HoTI packet.

4. The method of claim 1, wherein the second key information is attached to a mobile options field of the HoT packet.

5. The method of claim 1, wherein the encryption method uses a DES (Data Encryption Standard) algorithm.

6. The method of claim 1, wherein the encryption method uses a triple DES (Data Encryption Standard) algorithm.

* * * * *